J. H. WARNER.
DRAFT ATTACHMENT FOR STUMP JUMP PLOWS AND THE LIKE.
APPLICATION FILED NOV. 16, 1920.
1,381,039.
Patented June 7, 1921.
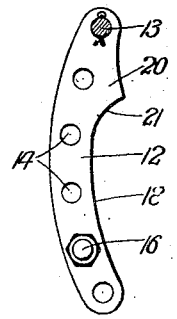
Fig. 1.
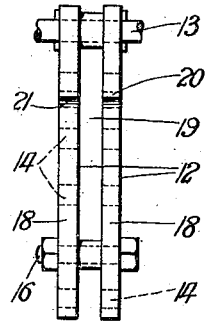
Fig. 2.
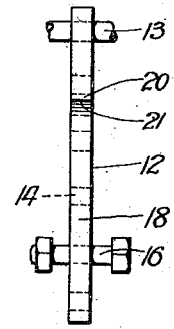
Fig. 3.
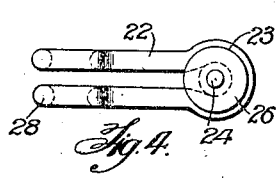
Fig. 4.
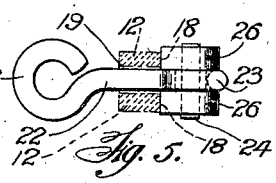
Fig. 5.
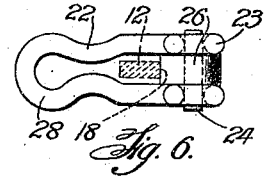
Fig. 6.
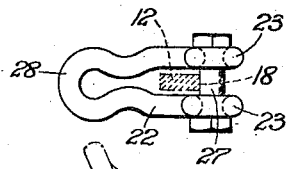
Fig. 7.
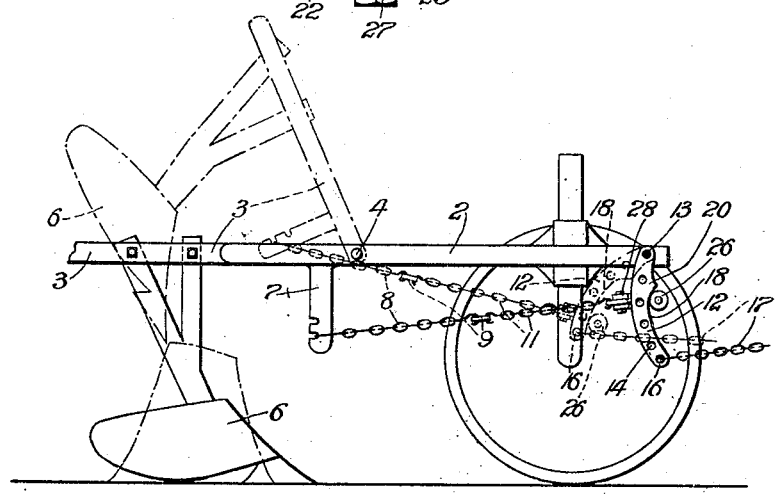
Fig. 8.
Inventor
J. H. Warner
by 
Atty.

UNITED STATES PATENT OFFICE.

JOSEPH H. WARNER, OF NHILL, VICTORIA, AUSTRALIA.

DRAFT ATTACHMENT FOR STUMP-JUMP PLOWS AND THE LIKE.

1,381,039.      Specification of Letters Patent.      Patented June 7, 1921.

Application filed November 16, 1920. Serial No. 424,548.

*To all whom it may concern:*

Be it known that I, JOSEPH HARVEY WARNER, a subject of the King of Great Britain and Ireland, and a resident of the post-town of Nhill, in the shire of Lowan, parish of Balrootan, in the county of Lowan, State of Victoria, Commonwealth of Australia, (whose post-office address is Nhill, in the said shire of Lowan,) have invented certain new and useful Improvements in Draft Attachments for Stump-Jump Plows and the like, of which the following is a specification.

This invention relates to draft attachments for stump jump plows and like agricultural implements such as stump jump scarifiers or cultivators and more particularly to such stump jump implements of the type wherein the shares are carried by pivoted jump arms or share carriers which are connected by chains or the like with a depending draft lever which is pivotally mounted on the front portion of the frame and is attached to the rear end of the draft chain by which the implement is drawn forwardly.

In such implements as at present constructed the chains or the like (hereinafter referred to as the share control chains) connecting the jump arms of the shares with said pivoted draft lever are usually fixedly attached to the draft lever by a bolt or pin. An objection to such an arrangement is that in the event of one or more of the shares striking a large stump or obstruction thus causing the pivoted draft lever to swing back to its limit, considerable strain is thrown on said lever and parts connected thereto, frequently leading to distortion or fracture of such parts.

The primary object of the present invention is to dispense with the fixed connection of the front ends of the share control chains to the draft lever and to provide a free connection which is adapted to rise and fall freely in relation to the draft lever, preferably through the medium of a roller running along the front face of the draft lever, said roller being directly connected with the shares through the share control chains aforesaid. Thus when a stump or obstruction is encountered by one or more of the shares and the draft lever swings backwardly about its pivot the free connection runs downwardly and backwardly along said lever thus allowing the shares to rise to a greater extent and causing the strain upon the draft lever and its parts to be relieved thereby reducing the liability of breakage or derangement.

An important feature of the invention resides in the curved or segmental form of the draft lever whereby the free connection or roller will readily rise, upwardly along the lever to its normal position after an obstruction has been passed and the share or shares have reassumed their normal attitude.

Referring to the drawings which form part of this specification:—

Figure 1 is a side view of a pivoted draft lever constructed in accordance with the invention.

Fig. 2 is a front view of Fig. 1.

Fig. 3 is a front view of a modified draft lever.

Fig. 4 is a side view of one form of free connection adapted to coöperate with the draft lever seen in Figs. 1 and 2.

Fig. 5 is a plan of Fig. 4 the draft lever being indicated in broken lines bearing against the rollers of the free connection.

Figs. 6 and 7 are plans of modified forms of the free connection.

Fig. 8 is a side elevation of portion of a stump jump plow showing the invention applied thereto. In broken lines the share is shown striking a stump, the draft lever being consequently swung backwardly and the free connection in its lowered position.

In the drawings the numeral 2 indicates the plow frame to which the jump arms 3 are pivoted by pivot pins 4, said jump arms carrying the shares 6. 7 denotes a dropper which depends from each jump arm and to which the rear ends of the share control chains 8 are attached. One of these chains 8 is connected with each of the shares, the front ends of said chains being attached to a cross bar 9 from which a single share control chain 11 extends forwardly to the draft lever 12.

The draft lever is pivoted as usual to the front of the plow frame by a transverse pivot pin 13 and is also provided with adjusting holes 14 accommodating a vertically adjustable draft pin or bolt 16 to which the rear end of the draft chain 17 leading to the draft animals is connected.

According to the invention the pivoted draft lever 12 is curved as shown in Figs. 1 and 8 to provide a curved or segmental front face 18 which forms a track for the roller or rollers hereinafter described. The lever 12 may be of duplex form as seen in Figs. 2 and 5 thus forming a space 19 between the two members 12 of the lever as seen in Figs. 2 and 5. These two members are each provided with a curved or segmental face 18. On the other hand as seen in Figs. 3, 6 and 7 the draft lever may comprise a single member 12 having a curved or segmental front face 18.

The segmental face or faces 18 is or are preferably provided with a projecting limit stop 20 which may have an arcuate lower surface 21. The function of this limit stop is to prevent the roller or rollers hereinafter described, rising beyond the desired normal position.

In combination with the foregoing I employ a free connection or coupling seen in detail in Figs. 4 to 7. This free connection may comprise a shackle 22 having a forward eye or eyes 23 to accommodate the axle 24 of a roller or rollers 26 said roller or rollers being adapted to engage the segmental face or faces 18 of the draft lever 12. It will be evident that the embodiment shown in Figs. 4 and 5 is adapted for use with the duplex draft lever seen in Fig. 2, the shackle 22 passing through the space 19 between the two members of the lever as in Fig. 5. In this embodiment two rollers 26 are provided, one to engage the curved face or track 18 of each of said members.

The free connection or coupling as seen in Fig. 6, is adapted for use with the draft lever seen in Fig. 3 and is provided with a single roller to engage the curved face 18 as clearly seen in Fig. 6.

As indicated in Fig. 7, it will be evident that although a roller or rollers as above described are highly desirable they are not indispensable as a non-rotating member such as a cross pin or bolt 27 may be accommodated by the forward eye or eyes 23 of the free connection to bear against the front face or track 18 of the draft lever.

The free connection or coupling is also preferably provided with a rear eye 28 for attachment to the front end of the share control chain 11.

In use the free connection normally lies near the top of the draft lever 12 the roller or rollers engaging the under surface of the limit stop 20 as seen in full lines in Fig. 8. Should one or more of the shares strike a stump or other obstruction, the draft lever will be swung backwardly about its pivotal point 13 and the free connection or coupling will run down the lever as indicated in dotted lines in Fig. 8. It will thus be evident that the draft control chains will be permitted to move rearwardly and the share or shares to rise to a greater extent than would be the case if the front end of the draft control chain 11 was fixedly attached to the draft lever at a point coinciding with the original position of the free connection or coupling. Moreover the strain on the draft control chains will, owing to the position of the free connection, tend to turn the draft lever 12 about its pivot instead of entailing a more or less direct strain against said pivot as happens when the chain 11 is fixedly attached as at present at a higher point on the draft lever.

When the stump or obstruction has been passed the draft lever will be swung forwardly to its original position by the tension on the draft chain 17, and owing to the curvature of the face or track 18 the roller or rollers will readily ride upwardly along said track to its or their original position adjoining the limit stop 20.

It will be obvious that the term "chain" as used in this specification is intended to cover other equivalent devices such as ropes or draw-bars and that various alterations or modifications of an unimportant nature may be made in the particular constructions described and illustrated without departing from the spirit and scope of the invention as defined in the appended claims.

Having now described my invention what I claim as new and desire to secure by Letters Patent is:—

1. Improvements in draft attachments for stump jump plows and the like consisting in the combination of an implement frame, pivoted share carriers mounted thereon, a depending draft lever pivoted on the front portion of the frame and having a curved face or track and a free connection or coupling for connecting the pivoted share carriers to said draft lever, said free connection being adapted to move freely along said curved track on the rising of a share or shares through encountering an obstruction, for the purpose set forth.

2. Improvements in draft attachments for stump jump plows and the like, consisting in the combination of an implement frame, a pivoted share carrier mounted thereon, a draft lever pivoted at its upper end on the front of the implement and adapted to receive the draft tension, a share control chain or connection uniting the share carrier with said draft lever and a free connection or coupling for attaching the forward end of said share control chain to the draft lever, said free connection having a roller to engage the front face of said lever and being adapted to move downwardly along the lever when a share rises on encountering an obstruction, for the purpose set forth.

3. Improvements in draft attachments for stump jump plows and the like, consisting in the combination of an implement frame, pivoted share carriers mounted thereon, a curved draft lever pivoted on the front portion of the frame, a draft chain or connection attached at its rear end to said lever and a free connection or coupling for connecting the pivoted share carriers with the draft lever, said free connection carrying a roller adapted to engage the curved front face of the draft lever for the purpose specified.

4. Improvements in draft attachments for stump jump plows and the like, consisting in the combination of an implement frame, pivoted share carriers mounted thereon, a draft lever pivoted at the front of the frame and having a segmental track on its front face, a draft chain or connection attached at its rear end to said lever and a free connection or coupling for connecting the pivoted share carriers with the draft lever, said free connections carrying a roller adapted to engage the segmental track of the draft lever, and a limit stop carried by the upper portion of the draft lever and adapted to engage the roller for the purpose specified.

5. Improvements in draft attachments for stump jump plows and the like, consisting in the combination of an implement frame, pivoted share carriers mounted thereon, a depending draft lever pivoted at its upper end to the front of the frame and having a segmental track and a series of superimposed adjusting holes, an adjustable draft pin adapted to pass through said holes, a draft chain or connection attached at its rear end to said draft pin and a free connection or coupling for connecting the pivoted share carriers with the draft lever, said free connection carrying a roller adapted to engage the segmental track of the draft lever for the purpose specified.

6. Improvements in draft attachments for stump jump plows and the like, consisting in the combination of an implement frame, pivoted share carriers mounted thereon, a depending draft lever pivoted at its upper end to the front of the implement, a share control chain or connection attached at its rear end to the share carriers, a free connection or coupling for attaching the front end of the share control chain to said draft lever, said free connection comprising a shackle having a forward eye and a rear eye between which eyes the draft lever passes, a transverse axle accommodated by the forward eye, a roller carried by said axle and adapted to move freely along the front of the draft lever, said rear eye being adapted to receive the front end of the share control chain.

In testimony whereof I affix my signature.

J. H. WARNER.

Witness:
   VICTOR J. KELSON.